United States Patent
Mallory, Sr.

[19]

[11] Patent Number: 6,015,443
[45] Date of Patent: Jan. 18, 2000

[54] MODULAR PULSING HEADER FOR FABRIC FILTERS

[75] Inventor: Timothy P. Mallory, Sr., Southport, Fla.

[73] Assignee: Merrick Environmental Technology Inc., Lynn Haven, Fla.

[21] Appl. No.: 09/328,823

[22] Filed: Jun. 9, 1999

[51] Int. Cl.[7] .................................................. B01D 46/04
[52] U.S. Cl. ............................................. 55/302; 95/280
[58] Field of Search ........................... 55/302, 283, 293; 95/279, 280

[56] References Cited

U.S. PATENT DOCUMENTS

| | | | |
|---|---|---|---|
| 3,383,774 | 5/1968 | Austin | 55/302 |
| 3,680,285 | 8/1972 | Wellan et al. | 55/302 |
| 4,033,732 | 7/1977 | Axelsson et al. | |
| 4,190,230 | 2/1980 | Geissbuhler | 55/302 |
| 4,280,826 | 7/1981 | Johnson, Jr. | 55/302 |
| 4,302,228 | 11/1981 | Ritter | 55/302 |
| 4,475,934 | 10/1984 | Kordas | 55/302 |
| 4,690,700 | 9/1987 | Howeth | 55/302 |
| 4,738,696 | 4/1988 | Staffeld | 55/302 |
| 5,062,867 | 11/1991 | Klimczak | 55/302 |
| 5,180,110 | 1/1993 | Brame | 55/302 |
| 5,395,409 | 3/1995 | Klimczak et al. | 55/302 |
| 5,533,706 | 7/1996 | Aurell | 55/302 |
| 5,571,299 | 11/1996 | Tonn | 55/302 |

*Primary Examiner*—Duane S. Smith
*Attorney, Agent, or Firm*—Phillip E. Decker

[57] ABSTRACT

A pulsing header apparatus for cleaning bag-type or cartridge-type fabric filters having a pulsing header and at least one blow tube attachment protruding from one side of the pulsing header. The pulsing header and blow tube attachment are cast, molded, or formed together a unitary component, defining a modular header. A port for attaching a pulsing valve is provided on a side opposite that of the blow tube attachment. The modular headers can be connected end to end using bolts to form a complete pulsing header apparatus.

18 Claims, 4 Drawing Sheets

MODULAR PULSING HEADER FOR FABRIC FILTERS

BACKGROUND

1. Field of the Invention.

The invention relates to apparatuses for cleaning bag-type or cartridge-type fabric filters employing pulses of compressed air.

2. Description of the Related Art.

Fabric filters are increasingly being used in many industries to remove particulates from industrial process gas streams. Due to tightening environmental regulations, fabric filters are often the only particulate control apparatus capable of bringing an industrial process into compliance with the laws.

In practice, fabric filters are most often formed into tall cylindrical bags which are placed over cylindrical wire cages of substantially the same size. The wire cylinders restrain the bags in their cylindrical shape. A number of these bags and cylinders are joined at the top by a tube sheet The assembly is secured within a bag house. In operation, particulate-laden gas is forced through or drawn into the bag house. The gas is forced through the filters, up through the center of the cages, out the tube sheet, and then out of the bag house. Particles remained trapped on the outside of the filter bags. If left uncleaned, the particles would soon clog the filter and prevent gas from flowing through.

To clean the filters, the most prevalent method is to periodically blow compressed air through the center of the bags. The compressed air is directed through a header apparatus, through pulse valves, and out a number of blow tubes that are centered over the bags. The compressed air temporarily inflates the bags, thereby blowing the particles off and into a hopper at the bottom of the bag house.

An improvement to this basic design is disclosed in U.S. Pat. No. 4,033,732, that was issued to Axelsson et al, on Jun. 5, 1977. This apparatus incorporated the pulse valve into the header in order to improve performance. The apparatus disclosed by Axelsson, however, requires a great deal of machining and other fabrication to make the header.

It is common in the art for blow tubes to be controlled by individual valves connected to a common header that permit the bags to be cleaned in sequence. Use of these apparatuses is very expensive, however. Blow tubes must be either welded or mechanically fastened to the header. The holes through which the blow tubes protrude must be precisely machined on a header that runs the entire length of the tube sheet. Any mistake on such a large and complex pressure vessel is very costly for the entire system, since the cost of the header apparatus often represents 10% of the cost of the bag house.

What is needed, therefore, is a header apparatus that is much more inexpensive to manufacture, is less likely to results in manufacturing mistakes, and for which manufacturing mistakes can be easily corrected.

SUMMARY

The present invention is directed to an apparatus that satisfies these needs. An apparatus having the attributes of the present invention comprises a pulsing header and at least one blow tube attachment protruding from the pulsing header, wherein said pulsing header and blow tube attachment are cast together as a unitary, modular component defining a modular header. The modular pulsing header apparatus can be cast in short module sections with one blow tube attachment and one pulse valve per module. Individual modules can be easily connected to form a complete pulse header assembly without expensive fabrication. Because the apparatus is cast, the opportunity for manufacturing mistakes and the need for expensive machining is greatly minimized. In case of mistakes, only one short module is effected instead of a multi-tube header assembly. These and other claimed features and embodiments of the invention will be made clear in the following drawings and description.

DRAWINGS

DESCRIPTION

Figure 1:
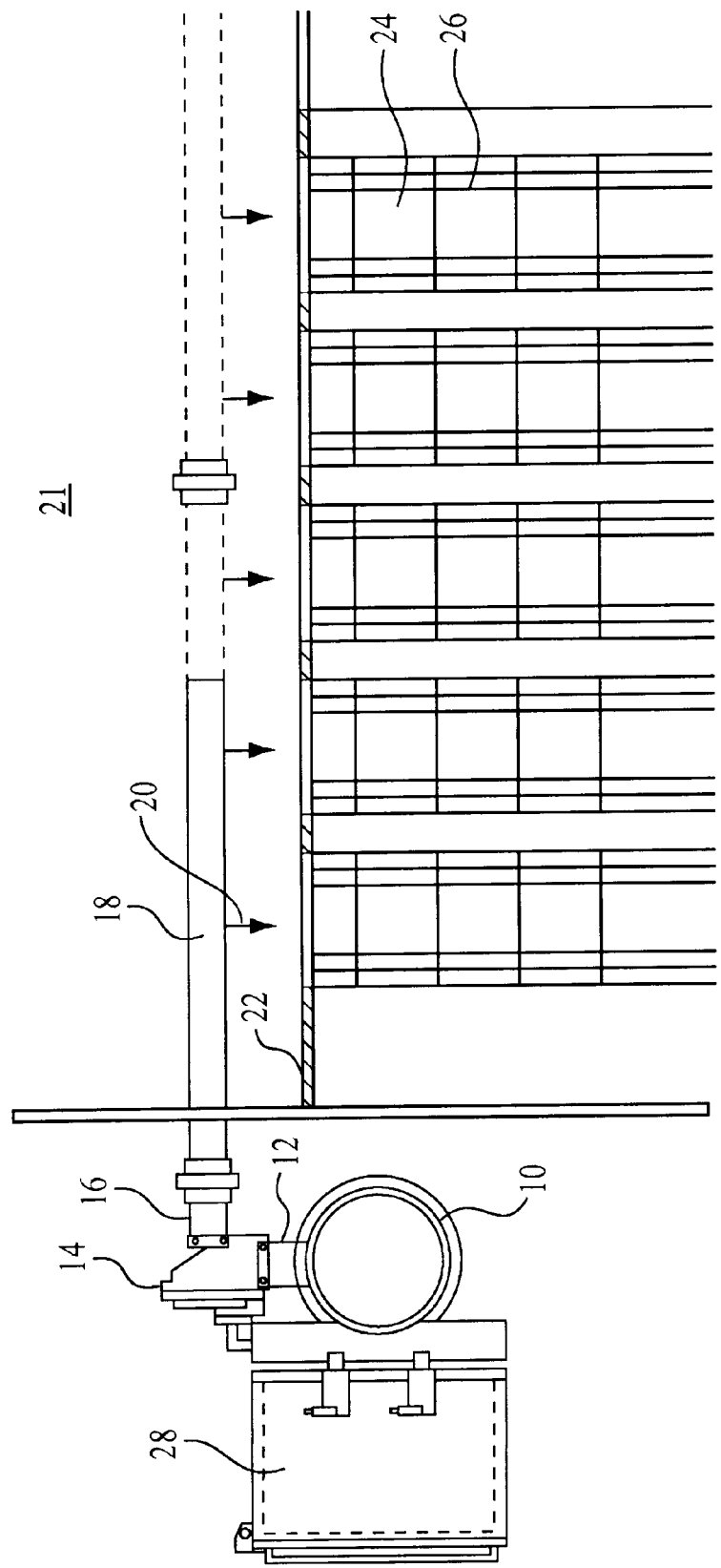
FIG. 1 is a cut-away view of a prior art pulsing header apparatus for cleaning fabric filters, also showing some details of a fabric filter bag house.

To better understand the many benefits of a modular pulsing header apparatus wherein the pulsing header and blow tube attachment are cast as a module, it is helpful to compare it to the state of the art prior to the invention. Turning to the drawings, FIG. 1 is a cut away view of a prior art pulsing header apparatus. Particle-laden gas in a standard bag house flows into a bag house into a region outside the fabric filter bags 24. The bags are typically cylindrical in shape. Particles become entrapped on the outside of the bags 24, and accumulate there until they are cleaned off. The bags 24 are installed over wire cylinders 26, which restrain the bags 24 in a cylindrical shape. The bags and cylinders are secured to a tube sheet 22 that provides structural support, and prevents particle-laden gas from mixing with cleaned gas. The cleaned gas flows into a plenum region 21, and then flows out of the bag house.

To clean the bags from accumulated particles, compressed air is blown into the center of the bags 24, temporarily inflating them. This blows the particles off of the bags 24 and into a hopper at the bottom of the bag house (not shown), where they are collected and removed. The prior art apparatus for cleaning the bags is also shown in FIG. 1. A header 10 contains compressed air, which is fed through a pipe nipple to a pulse valve 14, which is ordinarily closed. A controller 28 periodically activates the pulse valve 14 to release compressed air through another pipe nipple 16 to a blow tube 18. The pipe nipple is typically connected to the blow tube by a pipe union. From the blow tube 18, air jets represented by arrows 20 are directed downward into the bags 24, which inflate them and clean off the particles.

As can be seen, there are many complex components to such a system which much be procured, fabricated, and assembled. There are five distinct components required: the header, pipe nipple, pulse valve, blow tube attachment nipple, and blow tube assembly. Considering that the pulsing header apparatus typically comprises ten percent of the cost of the entire bag house, improvements that dramatically reduce its cost are highly desirable.

The Axelsson reference, not shown in these drawings, improves on this apparatus. Axelsson attaches the pulse valve directly onto the header at a valve port. Axelsson has therefore reduced the requirement components to just four: a header, pulse valve, blow tube attachment nipple, and blow tube assembly. However, the blow tube attachment nipple must still be welded or screwed or otherwise attached onto the header. More improvements could be made.

The present invention reduces the number of required components to just three: a modular pulsing header apparatus, blow tube, and a pulsing valve, by utilizing a modular approach. The pulsing header, having a blow tube attachment nipple and valve port, can be cast together as one module. Because of the cost savings of casting over machining and welding, and reducing the number of components required, the complete pulsing header apparatus of the present invention saves 50% of the cost of the prior art header apparatus. The present invention is described as follows.

Figure 2:
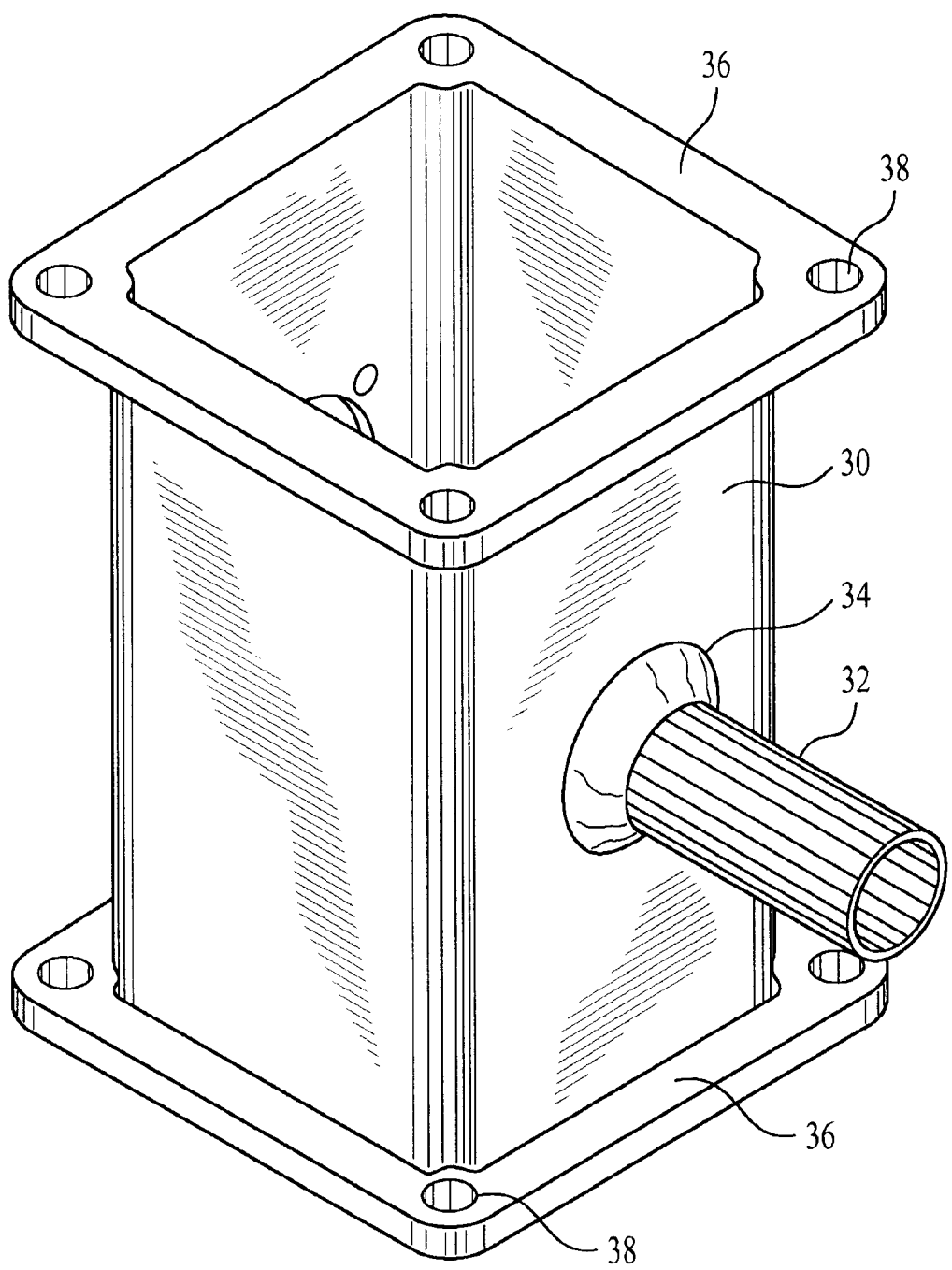
FIG. 2 is a perspective view of a modular pulsing header apparatus according to the present invention, showing details of the blow tube attachment to the pulsing header.

FIG. 2 is a perspective view of a pulsing header 30. The pulsing header 30 is shown as substantially rectangular, but can be cylindrical, or any other polygonal structure. A blow tube attachment 32 protrudes from the pulsing header 30. It forms a unitary, modular component in that the blow tube attachment 32 and pulsing header 30 are fabricated together by casting, injection molding, or even by powder metallurgy. In the prior art, a blow tube attachment or nipple would be secured to a header or other hardware by welding, using screw-type fittings, pipe fittings, or other fastening means. (In this specification, the term "blow tube attachment" in the present invention corresponds to the "pipe nipple" of the prior art.) It required precision work, and manufacturing mistakes could require the entire assembly to be scrapped. In the present invention, the joint 34 is made during the casting, molding, or forming by powder metallurgy processes which require less labor and are very repeatable.

In FIG. 2, the blow tube attachment 32 protrudes from one side of a substantially rectangular pulsing header 32. The pulsing header has openings on sides adjacent to the blow tube side. Flanges 36 may be provided at each opening for securing modular headers together end to end, forming part of the modules' connecting means. The flanges 36 may be cast, molded, or formed by powder metallurgy along with the pulsing header and blow tube attachment The flanges allow a number of modular headers to be secured together by any of a number of devices and methods, also part of their connecting means. These devices and methods include, but are not limited to, twist-lock connectors, threaded connectors, bolts, snap lock connectors, clamp connectors, use of a single clamp, use of a single bolt, glue, and solvent welding. Other connecting means that are well known in the art can be used. As shown in FIG. 2, bolt holes 38 can be provided for forming a bolted connection.

Figure 3:
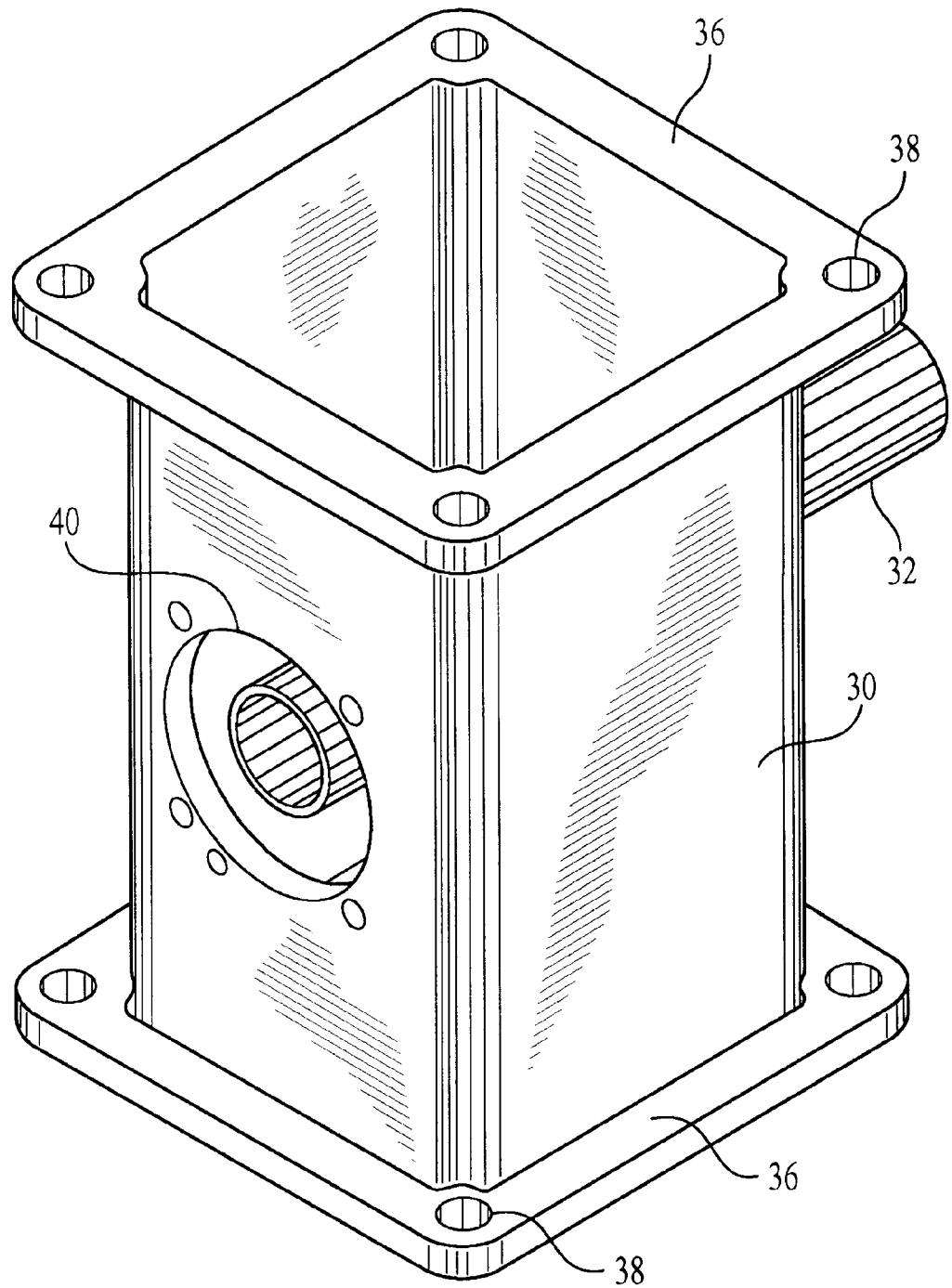
FIG. 3 is a perspective view of a modular pulsing header apparatus according to the present invention, showing details of the pulse valve port.

FIG. 3 is also a perspective view of a pulsing header 30 with the blow tube attachment 32 pointing away from the viewer. This reveals the pulsing valve port 40 that can be cast, molded, or formed as a part of the module on a side opposite that of the tube protrusion. The port 40 is suitably adapted for mounting a pulsing valve onto the pulsing header 30 such that the pulsing valve is in pneumatic communication with the blow tube attachment 32. As can be seen in FIG. 3, the blow tube attachment 32 extends internally almost to the port 40. It will be sized according to the properties of the pulsing valve selected. When installed, the valve is typically "closed" and prevents compressed air in the interior of the header 30 from entering the blow tube attachment 32. When the valve is activated by a controller, the pulsing valve releases its seal on the blow tube attachment, permitting compressed air to enter therein.

Figure 4:
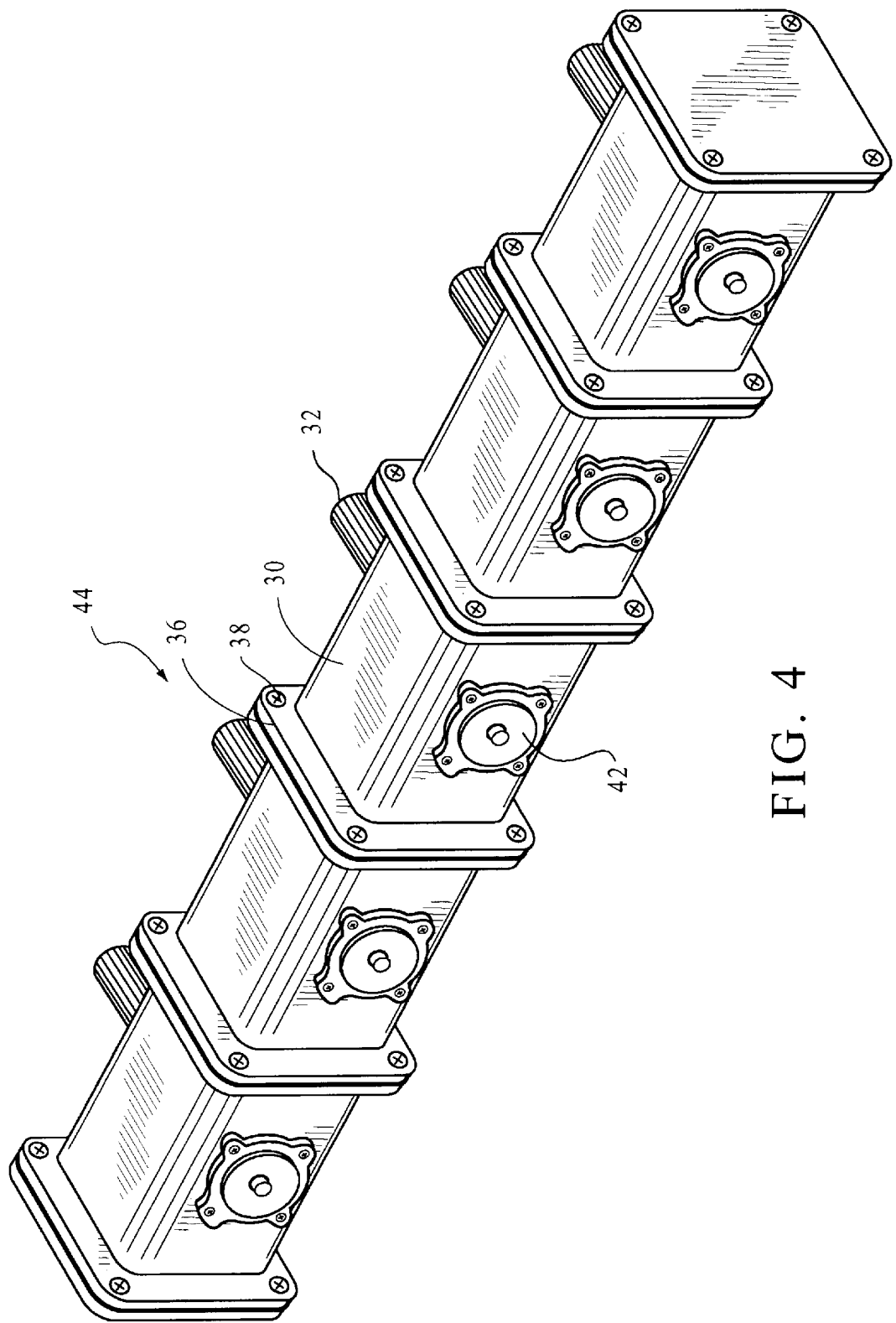
FIG. 4 is a perspective view of a pulsing header assembly comprising a plurality of header modules secured end to end.

FIG. 4 is a perspective view of a pulsing header assembly 44 comprising a plurality of header modules secured end to end. The details of the connecting means is not shown. This view also shows the pulsing valves 42 installed onto the pulsing headers 30.

The present invention helps to make pollution control equipment, namely bag houses, more affordable because the pulsing header modules can be mass-produced by modem machinery, unlike pulsing headers in the prior art. Because they will now cost less, it is likely that more of them will be sold and used in industry. This will have the effect of lowering the amount of particulate air pollution in the regions where they are used.

When used for fossil fuel electric power generation, the present invention also tends to increase the efficiency of power plants. Efficiency of these plants is often low because, in practice, power plants must intentionally lower their power output from their capacity limit, or "de-rate", if their particulate emission rates get too high. De-rating is an expensive waste of resources, since a larger number of power plants must be used to make the same electricity. Use of the present invention will economically allow plants to operate closer to their capacity limits and therefore reduce the necessity to de-rate.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

I claim:

1. A modular pulsing header apparatus for cleaning fabric filter bags comprising a pulsing header and at least one blow tube attachment protruding from a side of the pulsing header,
    said pulsing header and blow tube attachment comprising a unitary, modular component defining a modular header;
    said pulsing header comprising a port on a side of the pulsing header, said port being suitably adapted for mounting a pulsing valve onto the pulsing header such that the pulsing valve is in pneumatic communication with the blow tube attachment; and
    wherein a plurality of said modular headers are capable of being connected to each other by a connecting means.

2. The apparatus of claim 1, wherein said modular header is fabricated by casting as a unitary component.

3. The apparatus of claim 1, wherein said modular header is formed by powder metallurgy.

4. The apparatus of claim 1, wherein said modular header is formed by injection molding.

5. The apparatus of claim 1, wherein said modular header pulse valve port is located on a side opposite the blow tube attachment side.

6. The apparatus of claim 1, wherein said modular header pulse valve port is located on a side adjacent the blow tube attachment side.

7. The apparatus of claim 1, said pulsing header further comprising connecting means suitably adapted for connecting a plurality of modular headers to each other.

8. The apparatus of claim 7, wherein said connecting means are cast as an integral part of the pulsing header.

9. The apparatus of claim 7, wherein said connecting means are twist-lock connectors.

10. The apparatus of claim 7, wherein said connecting means are at at least one threaded connection.

11. The apparatus of claim 7, wherein said connecting means are cast as an integral part of the pulsing header in the form of at least one snap lock connection.

12. The apparatus of claim 7, wherein said connecting means are at least one bolted connection.

13. The apparatus of claim 7, wherein said connecting means are at least one clamped connection.

14. The apparatus of claim 7, wherein said connecting means are a glued connection.

15. The apparatus of claim 7, wherein said connecting means are a solvent welded connection.

16. The apparatus of claim 1, wherein a plurality of said header modules are connected by a single clamp.

17. The apparatus of claim 1, wherein a plurality of said header modules are connected by a single bolting system.

18. A pulsing header apparatus for cleaning fabric filter bags comprising a plurality of modular headers.

* * * * *